Sept. 16, 1952　　　　C. C. S. LE CLAIR　　　　2,610,768
GREASE GUN HAVING RESERVOIR COVER AND
AUTOMATIC LOCKING MEANS THEREFOR
Filed March 19, 1947　　　　　　　　　　　　5 Sheets-Sheet 1

FIG.I.

Inventor
Camille Clare Sprankling LeClair
By
Hinkle, Horton, Ahlberg, Hausmann & Wupper
Attorneys.

Patented Sept. 16, 1952

2,610,768

UNITED STATES PATENT OFFICE 2,610,768

GREASE GUN HAVING RESERVOIR COVER AND AUTOMATIC LOCKING MEANS THEREFOR

Camille Clare Sprankling Le Clair, Acton, London, England, assignor to Tecalemit Limited, Brentford, England, a corporation of Great Britain Application March 19, 1947, Serial No. 735,720
In Great Britain April 27, 1946

12 Claims. (Cl. 222—153)

This invention relates to fluid-operated grease guns and more particularly to grease guns operated by air under pressure of the type comprising a gun barrel, a grease-tight plunger slidable therein, an air operating cylinder, an air operated piston slidable in the operating cylinder and adapted to actuate the plunger, the area of the piston being many times the area of the plunger, so that the pressure applied to the grease through the piston and plunger is many times the pressure of the operating air, inlet and outlet air ports communicating with the operating cylinder and controllable by a valve or valves, a grease containing reservoir cylinder, the grease space of which is closed by a detachable fitting cap and which communicates with the gun barrel and a follower piston which is slidable in the reservoir cylinder and is subject to the pressure of the operating air so as to force grease into the gun barrel. In a grease gun of this type, air is admitted to the operating cylinder upon movement of the valve or valves in one direction and forces forward the air operated piston and the plunger to deliver a charge of grease at the discharge outlet from the barrel, while movement of the valve or valves in the opposite direction allows the air in the operating cylinder to exhaust to atmosphere, the plunger and piston to retract and the gun to be recharged from the grease reservoir with grease thrust forward by the air pressure acting on the follower piston.

Guns of the above mentioned type suffer from the disadvantage that, should the operator inadvertently remove the grease filling cap while the air pressure is acting on the follower piston, the cap and perhaps the follower piston itself, together with any residue of grease, would be blown forcibly from the grease reservoir, possibly causing a serious accident.

It is an object of the present invention to provide a grease gun of the type referred to, operated by air or other fluid under pressure in which this disadvantage is overcome and in which the risk of such an accident is reliably avoided.

According to the present invention, therefore, a grease gun of the type referred to comprises locking means for locking the filling cap against removal from the grease reservoir, in combination with actuating means which is adapted to bring the locking means into its operative position to lock the cap when the pressure fluid supply conduit is connected to the gun, the actuating means being effective to operate the locking means either whether or not the conduit is supplied with pressure fluid or, alternatively, only when the conduit is supplied with pressure fluid.

The locking means may comprise a bolt or catch member which is adapted to engage with the filling cap to lock the same against removal when the pressure fluid supply conduit is connected to the gun. The bolt or catch member may be operatively connected mechanically to a member which is slidably mounted upon the grease gun and which is adapted to be displaced by the conduit into its operative position, in which the filling cap is locked against removal, when the conduit is connected to the gun.

In one construction of this kind, a sleeve surrounds, and is slidable on, the pressure fluid inlet tube of the grease gun adjacent to the position occupied by the pressure fluid supply conduit when it is connected to the inlet tube. The sleeve is conveniently connected by a flexible cable, semi-stiff wire, linkage or other means to a slidably mounted locking bolt which is adapted to engage in one of a number of holes, slots or recesses formed in a screwed filling cap on the reservoir. When the fluid supply conduit is connected to the inlet tube it engages and presses back the sleeves, which latter in turn through the flexible cable, semi-stiff wire linkage or other means operates the locking bolt to force the latter into engagement with one of the holes, slots or recesses in the filling cap, thus preventing the latter being unscrewed. Removal of the pressure fluid supply conduit allows the locking bolt to retract, preferably under spring action, to release the filling cap, which latter can then be unscrewed.

As mentioned above, however, the actuating means for bringing the filling cap locking means into its operative position to lock the filling cap against removal from the grease reservoir may be effective only when the pressure fluid supply conduit, after being connected to the grease gun is supplied with pressure fluid.

Thus, in such a construction the locking means may still consist of a locking bolt or catch member which is adapted to engage in any one of the holes, slots or recesses in the filling cap, but instead of being actuated through the agency of a flexible cable, semi-stiff wire or linkage or like means, the bolt or catch member is actuated by fluid-operated means which, as soon as fluid pressure is applied to the grease gun, acts to force the locking bolt or catch member forward so that it engages, or is in a position to engage, one of the said holes, slots or recesses.

As will appear hereinafter, the fluid-operated means preferably comprises a pressure fluid operated actuating piston which is associated with the locking bolt or catch member and is slidable in a cylinder which is connected to the source of supply of pressure-fluid by which the grease gun is operated.

The invention is particularly applicable to air-operated grease guns of the type referred to above and it will be described in greater detail, by way of example as applied to a gun of this type.

Two constructional forms of the invention are shown, by way of example, on the accompanying sheets of drawings, whereon.

Figure 1:
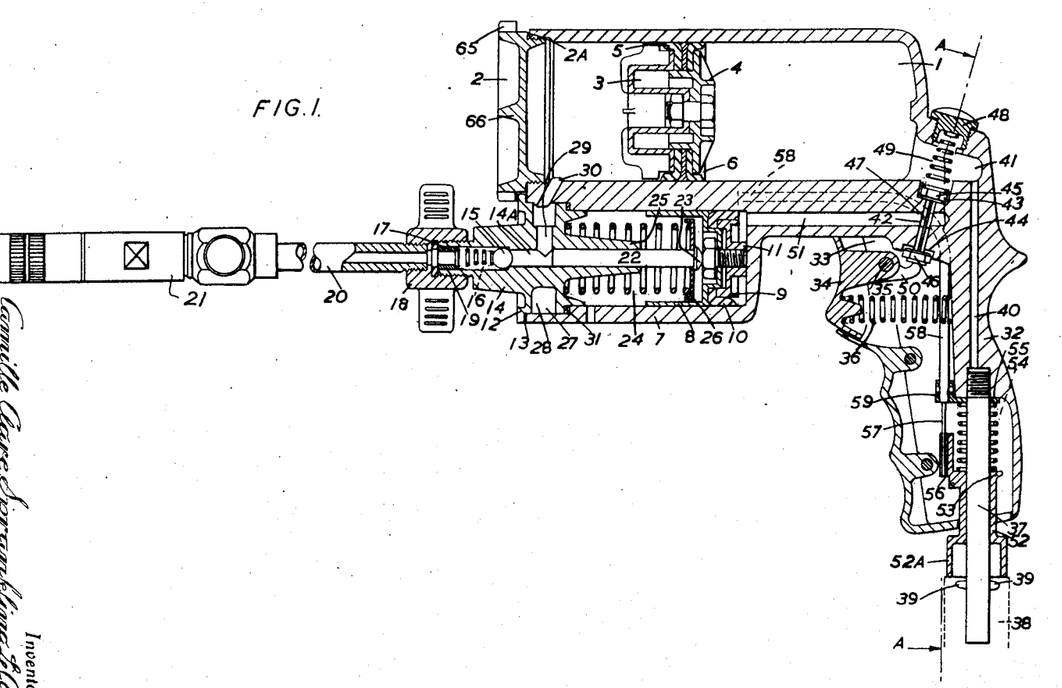
Figure 1 is a longitudinal section of an air-operated grease gun having a locking bolt for the grease reservoir filling cap which is rendered effective as soon as the compressed air supply hose is connected to the gun and whether or not the hose contains compressed air.
Figure 2:
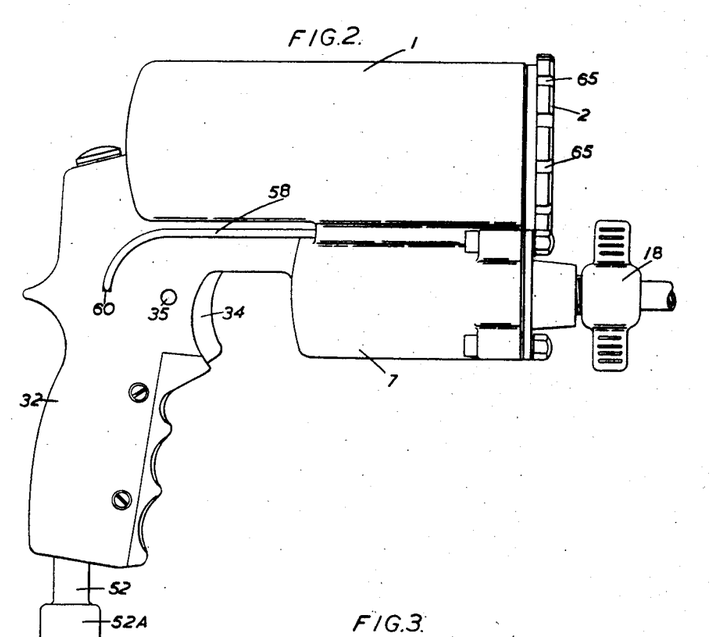
Figure 2 is a side view of the grease gun.
Figure 3:
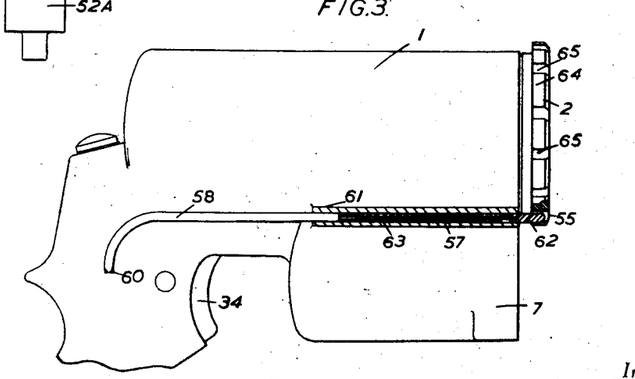
Figure 3 is a fragmentary side view of the grease gun, partly in section, showing the locking bolt in its operative position engaging in one of a number of slots formed in the filling cap.
Figure 4:
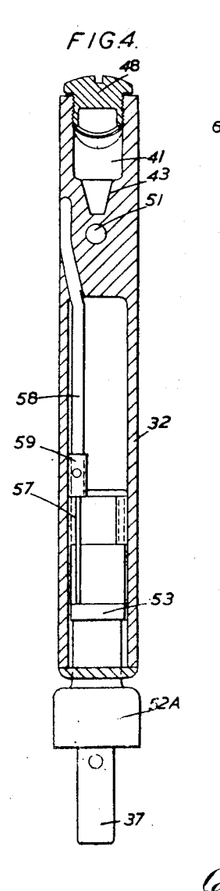
Figure 4 is a section on the line A—A in Figure 1.
Figure 5:
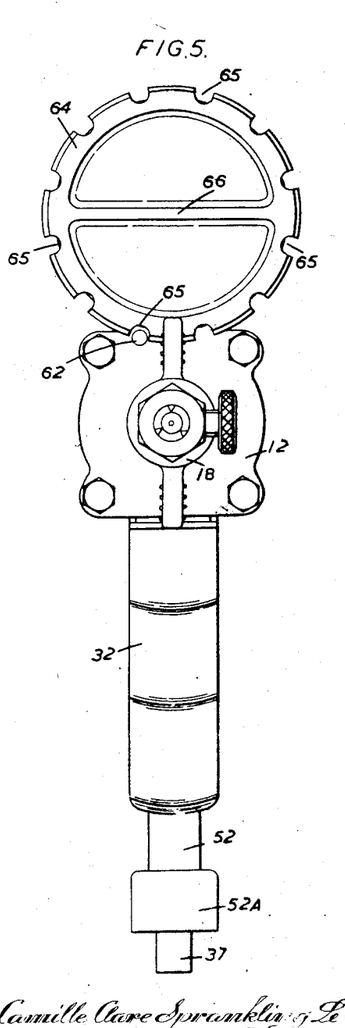
Figure 5 is a front view of the grease gun.

Referring to Figures 1 to 5:

The gun comprises a reservoir cylinder 1 which is closed at its forward end by means of a screwed filling cap 2 the full diameter of the cylinder. Slidable in the cylinder is a follower piston which comprises a piston body 3 of somewhat dished or cup-like form and a clamping plate 4 bolted to the body. The body and the clamping plate each have an external flange and between the two flanges are clamped two flexible sealing rings 5 and 6 having their pressure sensitive lips directed in opposite directions.

Below the reservoir cylinder 1 and attached to or integral with it is an air operating cylinder 7 provided with an air operated piston. The piston comprises a skirt part 8 and a crown 9, to which latter a rearwardly facing flexible sealing ring 10 is attached by means of a clamping plate 11 bolted to the piston by means of a central bolt.

The forward end of the operating cylinder 7 is closed by means of a cover plate 12 which is held in position by means of bolts or studs, a sealing washer 13 being arranged between the cover and cylinder. Integral with, and extending forwardly and rearwardly from, the centre of the cover plate is a cylindrical gun barrel 14 having a central bore 14A in the forward end of which is located a discharge valve, which consists of a ball 15 which is pressed inwardly onto its seat by means of a compression spring 16 the other end of which bears against the inner end of a sleeve 17 screwed into the outer end of a boss 19 on the gun barrel. A hollow coupling member 18 is also screwed onto the outer end of the boss 19 and to it is screwed a grease discharge pipe 20 fitted with a nozzle 21.

A high pressure plunger 22 is slidable in the gun barrel, its rear end being formed with a head 23 which is engaged by the air operated piston. A compression spring 24 surrounds the rearward or inner part 25 of the gun barrel and the plunger 22, and is compressed between the inside of the cover plate 12 and a pan 26 mounted on the plunger in front of the plunger head 23. The spring urges the plunger and the air operated piston towards the rear.

The cover plate 12 is of appreciable thickness and fits for the most part within an enlargement 27 of the end of the bore of the cylinder 7. Within the thickness of the cover plate is formed an annular groove 28 which communicates by means of at least one radial port 29 with the bore 14A of the barrel and also with the forward end of the reservoir cylinder 1 through a port 30 formed in the wall of the latter. A flexible sealing washer 31 is provided between the cover plate and the operating cylinder behind the annular groove 28.

The gun is provided at its rear end with a hollow downwardly-extending handle 32 having a recess 33 in its forward upper part in which a trigger 34 is pivotally mounted at 35, the trigger being constantly urged outwards by a spring 36. An air inlet tube 37 to which the air hose 38 is connected is screwed into the handle and it is provided near its lower end with a pair of oppositely-directed, external lugs 39 which are adapted to engage in bayonet catch slots in a fitting on the end of the hose.

The inlet tube 37 communicates by way of a passage 40 formed in the handle with a chamber 41 extending from the rear end of the grease reservoir cylinder 1 and communicating by means of a downwardly inclined port 42 with the trigger recess 33 in the handle. The upper and lower ends of the port are counterbored at 43 and 44 respectively forming valve seats for the upper and lower valves 45 and 46 of a double valve member, the valves being mounted on the ends of a common valve spindle 47 slidable in the port 42.

The wall of the reservoir cylinder 1 above the chamber 41 is formed with a threaded opening which is closed by means of a hollow screwed plug 48. A compression spring 49 is arranged between the plug and the upper part of the double valve member, and thrusts the member downwardly by pressing the upper valve 45 onto its seat and at the same time pressing the lower valve 46 off its seat. The lower end of the double valve member is engaged by a lug 50 on the trigger 34, so that pressure on the trigger will raise the valve member against the pressure of its spring 49 to close the lower valve and to open the upper one, the trigger normally being spring-urged into its inoperative position as mentioned above. There is an annular clearance between the valve spindle 47 and the wall of the port 42 containing it and the port communicates by means of a longitudinal passage 51 in the lower wall of the reservoir cylinder 1 with the rear end of the operating cylinder 7.

A sleeve 52 is slidably mounted on the air inlet tube 37 and is arranged partly within and partly outside the handle 32. The lower end of the sleeve is enlarged at 52A and is adapted to be engaged by the end of the fitting on the air hose 38 when the latter is coupled to the inlet tube. The upper end of the sleeve is formed with a flange 53 which is engaged by a compression spring 54 surrounding the inlet tube and abutting against a shoulder 55 inside the handle. The spring 54 urges the sleeve downwardly and the movement of the sleeve is limited by the engagement of the flange 53 with a shoulder on the wall of the handle or in any other convenient manner.

A lug 56 integral with the flange 53 on the sleeve is connected to one end of a semi-stiff wire 57 which is led through a tube 58 one end of which is connected to a lug 59 inside the handle. The tube is led upwardly from the lug through a hole 60 (Figures 2 and 3) in the handle externally of the reservoir cylinder 1. Following a curve of easy radius the front end of the tube is tightly fitted in a lug 61 which is bored to receive a locking bolt 62, the latter being slidable in the bore and attached to the forward end of the semi-stiff wire 57. The locking bolt is adapted to project out of the bore under the action of a compression spring 63 (Figure 3) which is arranged in the bore and surrounds the wire within the bore and which is compressed between the rear end of the bolt and the forward end of the tube 58. The spring 63 and the spring 54 surrounding the air inlet tube 37 act in opposite directions putting the semi-stiff wire 57 under tension and as the latter spring is the more powerful, the sleeve 52 on the air inlet tube is held in its lower position and the locking bolt 62 is retracted into its non-operative position within the bore in the lug 61 when the air hose is not connected to the air inlet tube.

The filling cap 2 closing the front end of the reservoir cylinder 1 is provided with a flange 64 which projects radially beyond the outer wall of the cylinder and in front of the locking bolt 62. The flange is formed with a number, for example, twelve, of spaced slots or recesses 65 into any one of which the locking bolt 62 is adapted to engage to lock the cap 2 and prevent it being unscrewed. A diametrically arranged cross-piece 66 (Figures 1 and 5) may be provided on the front face of the filling cap to form a finger and thumb handle by means of which the cap may be unscrewed.

The arrangement is such that when the air hose is not connected to the gun the locking bolt 62 is retracted and the filling cap 2 can be removed. The reservoir cylinder 1 can then be filled with grease, the follower piston being forced to the rear and the filling cap replaced.

If the air hose is now connected to the air inlet tube 37 the sleeve 52 on the latter will be raised, thrusting the semi-stiff wire 57 forward in its tube 58 and causing or permitting the locking bolt 62 to be moved forward, with the aid of its spring 63, into one of the slots 65 in the flange 64 in the filling cap 2. It will be appreciated that before this can be done, care must be taken that a slot is aligned with the end of the locking bolt. This can be ensured when the cap is screwed tight home by providing a sealing washer 2A (Figure 1) of suitable thickness between the cap and the end of the grease reservoir cylinder 1 or by using a soft sealing washer which will provide a tight seal over a range of movement of the cap sufficient to ensure that one slot can always be brought opposite to the end of the bolt. The filling cap is thus securely locked in position whether or not there is any air pressure in the hose.

The operation of the gun is as follows. When air is supplied under pressure through the air hose 38 it passes up the passage 40, into the chamber 41, and thence to the rear end of the reservoir cylinder 1 behind the follower piston 3, upon which it exerts its pressure forcing the piston forward in the reservoir cylinder 1 to force a charge of grease into the forward end of the gun barrel bore 14A through the annular groove 28 and the associated ports 29 and 30 referred to above. During this operation the plunger 22 and the air operated piston with which it is associated are held to the rear by the spring 24 thus uncovering the inlet port and permitting the entry of the grease. The discharge valve 15 is so loaded that it is not opened by the pressure of the incoming grease and hence no grease will be discharged from the gun.

Air under pressure is thus prevented from acting on the operation piston by the upper valve 45 which is held onto its seat by the action of the spring 49, and the operating cylinder is in communication with the atmosphere through the passage 51 and the lower valve 46 which is open.

When, however, the trigger 34 is operated through the lug 50 it closes the lower valve 46 and opens the upper valve 45, thereby allowing air under pressure to be supplied to the operating cylinder 7 and forcing the air operated piston and the plunger 22 forward. After it has closed the end of the grease inlet port 29 from the reservoir, the plunger forces a charge of grease under high pressure out of its cylinder 14A past the discharge valve 15 and thence through the discharge pipe 20 to the nozzle 21.

When the trigger 34 is released, the upper valve 43 once more closes and cuts off the air supply to the operating cylinder 7, from which the air is allowed to exhaust to atmosphere through the passage 51 past the lower valve 46, which is once again opened. The plunger 22 and air operated piston are retracted by their spring 24 and a fresh charge of grease is supplied to the gun barrel from the reservoir cylinder 1 by the air pressure acting on the follower piston. The gun is thus ready for a further operation when the trigger is next actuated.

It will be appreciated that as long as the air hose is connected to the gun the filling cap 2 is locked in position and cannot be removed, quite irrespective of whether or not there is any air pressure in the hose. Before the filling cap can be removed for any purpose the air hose must be disconnected from the gun thereby entirely avoiding any risk of an accident occurring.

In the modified constructional form of the invention shown in Figs. 6 to 9, the air-operated grease gun again comprises a grease reservoir cylinder 70, which is closed at its forward end by a screwed filling cap 71 provided with a flange 72 which projects radially beyond the outer wall of the cylinder and in front of the locking bolt. The flange is formed with a number, for example, twelve, of spaced slots or recesses 73 into any one of which the locking bolt is adapted to engage to lock the cap and prevent it being unscrewed as described hereinafter. A diametrically arranged cross-piece 74 may be provided on the front face of the filling cap to form a finger and thumb handle by means of which the cap may be uncovered.

Figures 6, 7:
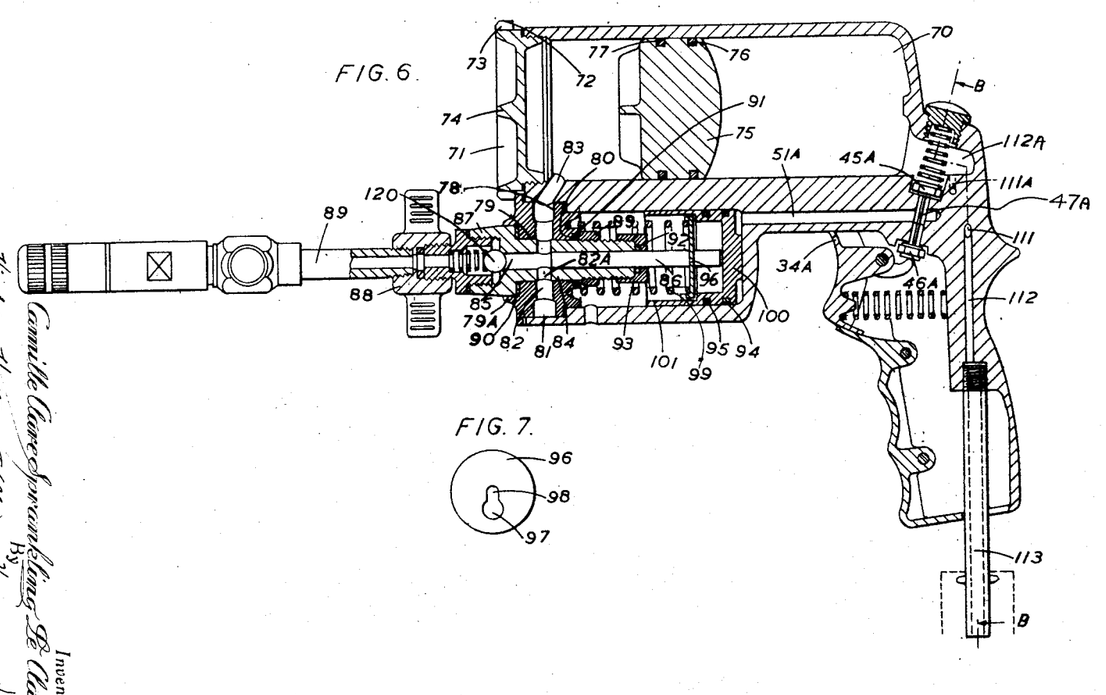
Figure 6 is a longitudinal section of a modified air operated grease gun having a locking bolt for the grease reservoir filling cap which is rendered effective only when the air supply hose is connected to the grease gun and when the hose contains compressed air.
Figure 7 is a rear view of the spring pan which acts as a support for one end of the coil spring which is associated with the air-operated piston and the high pressure plunger.

The follower piston 75 however, is not constructed in built-up manner as in the grease gun described above but it is made in one-piece and is formed with two axially-spaced annular recesses, in which are fitted sealing rings. As shown, these rings need not be identical, for example, one may be a circular or O section rubber, or the like, sealing ring as shown at 76, while the other may be a felt washer as shown at 77. The follower piston is not provided with cup leathers as is the piston described above.

Whereas in the grease gun described with reference to Figs. 1 to 5 above the cover member 12 of the air-operating cylinder 7 embodied the cover itself, the plunger cylinder or barrel 25 and the chamber and seat for the grease outlet valve 15, the corresponding cover member of the present construction embodies the cover only.

The cover 78 is preferably die cast with a die cast bore 79. On its front face it is formed with a circular recess 79A having two flats and on its rear face it is formed with a plain circular recess 80. The cover is also formed with an annular groove 81 and a transverse port or ports 82; a port 83 also connects the groove 81 to the forward end of the grease reservoir cylinder, all as in the above described gun.

The gun barrel is a separate member and comprises a longitudinally extending shank 84 which fits into the axial bore 79 of the cover 78, and which is bored from end to end, so as to form the gun bore 85 in which the plunger 86 slides. At the forward end the barrel is formed with a head 87 of larger diameter, which is counterbored and threaded internally to form the valve chamber and the valve seat of the outlet valve 120 and to receive the union connection 88 to which the grease discharge pipe 89 is attached. The head 87 is also formed with two flattened cheeks, which are so shaped that the head fits into the front recess 79A in the cover 78 but cannot turn therein. The gun barrel is formed with radial ports 82A which provide communication between the bore 85 of the barrel and the transverse ports 82 and thus, via the aforesaid groove 81 and port 83 with the forward end of the reservoir cylinder 70. The gun barrel is held in place in the axial bore 79 by a nut 89 screwed on the barrel, and liquid tight engagement between the barrel and the cover is obtained by packings 90 and 91 fitted respectively in the recesses 79A and 80.

The rear end of the barrel is fitted with a circular or O section ring seal 92, which is held in place by a nut 93 screwed on to the rear end of the barrel.

The air operated piston 100 is formed with two annular grooves fitted, for example, with a circular or O section sealing ring 94 in one and a felt washer 95 arranged in the other in similar fashion to those in the grease reservoir follower piston 75 described above.

The plunger 86 is not formed with a head as in the case of the grease gun shown in Figs. 1 to 5, but has an annular groove into which a spring pan 96 is fitted. As shown in Figure 7, the pan is formed with a "keyhole" slot in such a manner that the large eccentrically disposed circular part 97 of the slot can be passed over the plunger, and then the plunger can be slid sideways to the centre of the disc, the narrow part 98 of the slot then fitting into the said annular groove. When the plunger 86 and its spring 99 are assembled in place and the air-operated piston 100, is entered into the operating cylinder bore, the pan 96 is held centrally by the skirt 101 of the piston and cannot slide sideways and thus become disengaged from the plunger. The coil spring 99 acts to thrust the plunger 86 and the piston 100 backwards to uncover the ports 82A at the end of the plunger suction stroke.

As mentioned above, the method of locking the cap 71 of the grease reservoir cylinder 70 has been altered and in place of the flexible cable or semistiff wire or the like operated by the act of coupling the air hose to the grease gun, the locking means is now operated by a piston sensitive to the air pressure.

Figure 8:
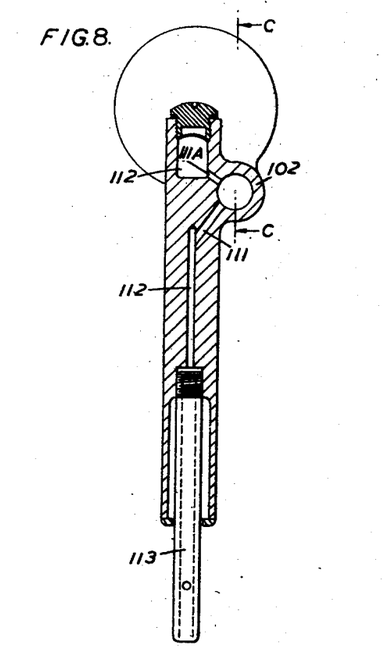
Figure 8 is a section on the line B—B in Figure 6.
Figure 9:
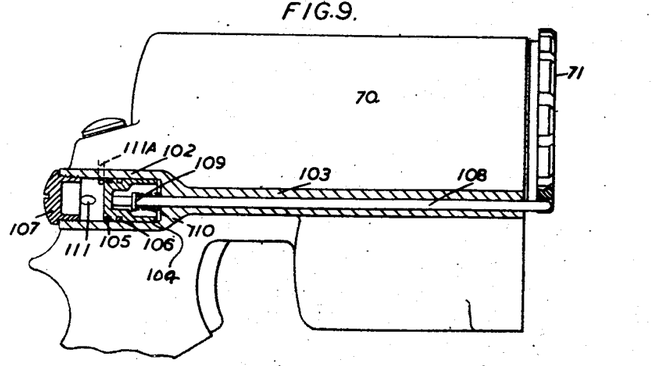
Figure 9 is a section on the line C—C in Figure 8.

A small actuating cylinder 102, see particularly Figures 8 and 9, is cast integrally with the main body of the grease gun, close to the rear end of the grease reservoir cylinder 70, and coaxial with this cylinder a long hollow boss 103 extends right up to the front face of the cylinder.

A hollow piston 104 is slidable in the actuating cylinder 102 and is formed with two annular grooves fitted with a felt washer 105 and a circular or O section sealing ring 106 respectively as already described in connection with the follower piston 75. The rear end of the cylinder 102 is threaded and closed by a screwed plug 107, a packing ring making a pressure tight joint between the plug and cylinder.

A locking bolt 108, provided with a shoulder 109 near its rear end, slides in the hollow boss 103, the rear end of the bolt being in contact with the inside of the hollow piston 102. The bolt 108 and the piston 104 are both held in their rearward positions by a coil spring 110 which reacts between the shoulder 109 and the front end of the actuating cylinder 102. When in this position, the forward end of the bolt is to the rear of the front face of the grease reservoir cylinder 70.

In this construction there is no direct connection between the air inlet pipe 113 and the grease reservoir cylinder 70. On the contrary, air from the inlet pipe 113 passes up the main inlet duct 112 and thence by a small diagonal port 111 to the space in the actuating cylinder 102 behind the actuating piston 104 when in its rearmost position. A second diagonal port 111A connects the air operating cylinder to the chamber 112A of the grease reservoir and is so arranged that it is covered by the bolt operating piston when the latter is in its rearward position, and hence when the reservoir cap is not locked, so that no air can pass through the port 111A into the reservoir cylinder. When, however, the piston is in its forward position, as shown in Figure 9, and the cap 71 is locked, the port 111A is uncovered and air can pass freely from the cylinder 102 into the reservoir cylinder 70.

In this manner, therefore, the grease gun cannot be used unless the locking bolt is in actual, not merely potential, locking engagement with one of the recesses 73 in the filling cap.

As soon as air pressure is applied to the grease gun through the air hose, the actuating piston 104 is immediately forced forward in the actuating cylinder 102, driving the locking bolt 108 forward, so that its forward end enters one or another of the recesses or slots 75 in the flange 72 of the grease reservoir cylinder cap 71, thus preventing the cap being removed while the air pressure is being applied.

When the cap is being screwed into position it is possible to leave it in such a position that not one of the slots or recesses 73 exactly registers with the locking bolt 108 so that, when the air pressure is applied the bolt cannot move forward to lock the cap. This is of no serious consequence, however, because, first it is impossible to operate the gun unless the cap is actually locked and secondly if an attempt were made to remove the cap while the air pressure were still applied, the first angular movement of the cap would bring a slot or recess 73 into registration with the bolt, which latter would immediately be thrust forward thus locking the cap.

As in the case of the grease gun shown in Figures 1 to 5, the above described modified gun comprises a double valve 45A, 46A having a stem 47A.

a trigger 34A and a passage 51A connecting the air operating cylinder to the chamber 112A of the grease reservoir cylinder. The double valve functions like that of the grease gun shown in Figures 1 to 5 to control the flow of air into and out of the air operating cylinder.

It will be understood that the simplified constructions of the follower piston 75, the air operated piston 100, the high pressure plunger 86, the cover 78 and the gun barrel 84 of the grease gun shown in Figures 6 to 9 may all be used in the grease gun shown in Figures 1 to 5.

It will also be understood that in place of the double valve arrangement described above, comprising two seated valves 45 and 46 connected by a stem 47, a piston valve of known type may be substituted.

While the invention has been described as applied to grease guns it will be apparent that it is not limited to guns for use with grease but is applicable to pressure-operated guns intended for use with any forms of liquid or semi-liquid lubricants or thixotropic solids or fluids in general.

I claim:

1. An air operated grease gun adapted to be connected to a source of air under pressure comprising a hand grip, a gun barrel, a grease-tight plunger slidable therein, an air operating cylinder mounted on said hand grip and mounting said gun barrel, an air operated piston slidable in said operating cylinder and adapted to actuate said plunger, the area of said piston being greater than the area of said plunger so that the unit area pressure applied to the grease through the plunger and piston is greater than the unit area pressure of the operating air, valve mechanism for controlling the inlet and outlet of air into and from said operating cylinder trigger means for actuating said valve mechanism, a grease-containing reservoir cylinder mounted on said hand grip, a follower piston slidable in said reservoir cylinder dividing said reservoir cylinder into a grease space and an air space and subject to the pressure of the operating air so as to force grease into said gun barrel, means forming a passageway interconnecting said grease space and said gun barrel, a detachable filling cap for closing said grease space, movable locking means adapted to lock said filling cap against removal from said cylinder, and actuating means for said locking means operable on connection of the source of air under pressure therewith and with the grease gun to move said locking means into locking position.

2. In an air operated grease gun adapted to be connected to a source of air under pressure, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, a detachable filling cap for closing said grease space of said cylinder, a movable locking element adapted to engage and lock said filling cap against removal from said cylinder, and actuating means for said locking means operable upon connection of the source of air under pressure therewith and with the grease gun to move said locking means into locking position.

3. In an air operated grease gun adapted to be connected to an air supply conduit, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, a detachable filling cap for closing said grease space of said cylinder, movable locking means adapted to lock said filling cap against removal from said cylinder, and actuating means for said locking means, said actuating means being engaged by the air supply conduit when the latter is coupled to the gun so as to move said locking means into locking position.

4. In an air operated grease gun adapted to be connected to an air supply conduit, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, an air inlet tube connected to said air space, a detachable filling cap for closing said grease space of said cylinder, a movable locking bolt adapted to lock said filling cap against removal from said cylinder, and actuating means for said locking means, said actuating means being engaged by the air supply conduit when the latter is connected to said air inlet tube whereby said locking bolt is moved into locking position.

5. In an air operated grease gun adapted to be connected to an air supply conduit, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, an air inlet tube connected to said air space, a detachable filling cap for closing said grease space of said cylinder, a movable locking bolt engageable with said cap and adapted to lock said cap against removal from said cylinder, and actuating means for said locking means, said actuating means comprising a member slidable on said air inlet tube and adapted to be engaged by the air supply conduit when the latter is connected to the tube, and a wire member connecting said slidable member with said locking bolt.

6. In an air operated grease gun adapted to be connected to an air supply conduit, the combination of a grease reservoir cylinder, a follower piston in said cylinder dividing said cylinder into a grease space and an air space, a grease outlet from said grease space, said follower piston being subject to air pressure to place the grease in said grease space under pressure to force it through said outlet, a detachable filling cap for closing said grease space of said cylinder, a movable locking bolt engageable with said cap and adapted to lock said cap against removal from said cylinder, spring means biasing said locking bolt out of locking position, and actuating means for said locking bolt, said actuating means being engaged by the air supply conduit when the latter is coupled to the gun so as to move said locking bolt against said spring means and into locking position.

7. In an air operated grease gun adapted to be connected to a source of air under pressure, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, a detachable filling cap for closing said grease space of said cylinder, said cap having peripheral notches, a movable locking bolt adapted to engage in one of said notches in said cap and thereby to lock said cap against removal from said cylinder, and actuating means for said locking bolt operable upon connection of the source of air under pressure therewith and with the grease gun to move said locking bolt into locking position.

8. In an air operated grease gun adapted to be connected to a source of air under pressure, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, an air inlet for said air space, a detachable filling cap for closing said grease space of said cylinder, movable locking means adapted to lock said filling cap against removal from said cylinder, and actuating means for said locking means, said actuating means comprising an air cylinder connected to said air inlet, an air operated piston in said cylinder, and means connecting said piston with said locking means whereby said locking means is moved into locking position when air under pressure is supplied to the grease gun.

9. In an air operated grease gun adapted to be connected to a source of air under pressure, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, an air inlet, a detachable filling cap for closing said grease space of said cylinder, movable locking means adapted to lock said filling cap against removal from said cylinder, and actuating means for said locking means, said actuating means comprising an air cylinder connected to said air inlet, a port connecting said air cylinder with said air space in said reservoir cylinder, and an air operated piston in said air cylinder adapted to uncover said port and admit air under pressure to said air space when actuated by air pressure in said cylinder, said air operated piston being connected to said locking means whereby said locking means is moved into locking position upon actuation of said air operated piston.

10. In an air operated grease gun adapted to be connected to a source of air under pressure, the combination of a grease reservoir cylinder, a follower piston in said cylinder dividing said cylinder into a grease space and an air space, a grease outlet from said grease space, said follower piston being subject to air pressure to place the grease in said grease space under pressure and to force it through said outlet, an air inlet, a detachable filling cap for closing said grease space of said cylinder, a movable locking bolt adapted to engage said cap to lock said cap against removal from said cylinder, an actuating means for said bolt, said actuating means comprising an air operated means connected to said air inlet and adapted to move said locking bolt into locking position when the grease gun is supplied with air under pressure.

11. An air operated grease gun adapted to be connected to an air supply conduit comprising a hand grip, a gun barrel, a grease-tight plunger slidable therein, an air operating cylinder mounted on said hand grip and mounting said gun barrel, an air operated piston slidable in said operating cylinder and adapted to actuate said plunger, the area of said piston being substantially greater than the area of said plunger so that the unit area pressure applied to the grease through the plunger and piston is substantially greater than the unit area pressure of the operating air, a double valve mechanism for controlling the inlet and outlet of air into and from said operating cylinder, a trigger carried by said hand grip for actuating said valve mechanism, a grease containing reservoir cylinder mounted on said hand grip, a follower piston slidable in said reservoir cylinder and dividing said reservoir cylinder into a grease space and an air space and subject to the pressure of the operating air so as to force grease into said gun barrel, means forming a passageway interconnecting said grease space and said gun barrel, means in said hand grip for connecting said grease gun to an air supply conduit, a detachable filling cap for closing said grease space, a movable locking bolt adapted to engage said cap thereby to lock said cap against removal from said cylinder, and actuating means for said locking bolt comprising a member engageable with the conduit when the latter is coupled to the grease gun and a semi-stiff wire connecting said member and said locking bolt.

12. An air operated grease gun adapted to be connected to a source of air under pressure comprising a hand grip, a gun barrel, a grease-tight high pressure plunger slidable therein, an air operating cylinder mounted on said hand grip and mounting said gun barrel, an air operated piston slidable in said operating cylinder and adapted to actuate said plunger, an air inlet in said hand grip for the grease gun, valve mechanism for controlling the inlet and outlet of air into and from said operating cylinder, a trigger carried by said hand grip for actuating said valve mechanism, a grease-containing reservoir cylinder mounted on said hand grip, a follower piston slidable in said reservoir cylinder and dividing said reservoir cylinder into a grease space and an air space and subject to the pressure of the operating air so as to force grease into said gun barrel, means forming a passageway interconnecting said grease space and the said gun barrel, a detachable filling cap for closing said grease space, movable locking means adapted to lock said filling cap against removal from said cylinder, and air operated actuating means for said locking means and associated with said air inlet, whereby said locking means is moved into locking position when the grease gun is supplied with air under pressure.

CAMILLE CLARE
SPRANKLING LE CLAIR.

REFERENCES CITED

The following references are of record in the file of this patent:

UNITED STATES PATENTS

| Number | Name | Date |
|---|---|---|
| 1,870,195 | Harris | Aug. 2, 1932 |
| 2,390,831 | Fitch | Dec. 11, 1945 |